United States Patent [19]

Bogue et al.

[11] Patent Number: 5,779,946

[45] Date of Patent: Jul. 14, 1998

[54] METHOD FOR SPIN PROCESSING MATERIAL HAVING TEMPERATURE FEEDBACK CONTROL

[75] Inventors: Beuford A. Bogue, Broad Run; John A. Hrubec, Annandale, both of Va.

[73] Assignee: Fuisz Technologies Ltd., Chantilly, Va.

[21] Appl. No.: 729,274

[22] Filed: Oct. 10, 1996

Related U.S. Application Data

[62] Division of Ser. No. 677,251, Jul. 9, 1996, which is a continuation of Ser. No. 425,337, Apr. 18, 1995, abandoned, which is a continuation of Ser. No. 49,773, Apr. 19, 1993, abandoned.

[51] Int. Cl.⁶ .................................................. B29C 67/00
[52] U.S. Cl. .................................................. 264/8; 264/40.6
[58] Field of Search .................................. 264/8, 40.6, 211.1

[56] References Cited

U.S. PATENT DOCUMENTS

| | | | |
|---|---|---|---|
| 856,424 | 6/1907 | Robinson | 425/9 |
| 1,489,342 | 4/1924 | Brent. | |
| 1,541,378 | 6/1925 | Parcell | 425/9 |
| 3,019,745 | 2/1962 | Du Bois et al. | |
| 3,036,532 | 5/1962 | Bowe. | |
| 3,070,045 | 12/1962 | Bowe | 425/9 |
| 3,073,262 | 1/1963 | Bowe | 425/9 |
| 3,095,258 | 6/1963 | Scott. | |
| 3,118,396 | 1/1964 | Brown et al. | |
| 3,118,397 | 1/1964 | Brown et al. | 425/9 |
| 3,125,967 | 3/1964 | Bowe. | |
| 3,131,428 | 5/1964 | Mika. | |
| 3,557,717 | 1/1971 | Chivers. | |
| 3,686,000 | 8/1972 | Lawrence. | |
| 3,723,134 | 3/1973 | Chivers. | |
| 3,762,846 | 10/1973 | Chivers | 425/7 |
| 3,882,725 | 5/1975 | Rao et al. | 73/342 |
| 3,902,351 | 9/1975 | Kreps. | |
| 3,925,525 | 12/1975 | La Nieve. | |
| 3,930,043 | 12/1975 | Waring et al. | 426/515 |
| 4,293,292 | 10/1981 | Israel | 425/9 |
| 4,376,743 | 3/1983 | Dees | 264/103 |
| 4,793,782 | 12/1988 | Sullivan | 425/7 |
| 4,846,643 | 7/1989 | Yamamoto et al. | 425/7 |
| 4,855,326 | 8/1989 | Fuisz | 514/777 |
| 4,872,821 | 10/1989 | Weiss | 425/9 |
| 5,011,532 | 4/1991 | Fuisz | 106/215 |
| 5,034,421 | 7/1991 | Fuisz | 514/772 |
| 5,096,492 | 3/1992 | Fuisz | 106/215 |
| 5,306,955 | 4/1994 | Fryer | 307/116 |

FOREIGN PATENT DOCUMENTS

| | | |
|---|---|---|
| 0 540 460 A1 | 5/1993 | European Pat. Off. . |
| WO 91/07952 | 6/1991 | WIPO . |

OTHER PUBLICATIONS

Seborg, Edgar and Mellichamp, *Process Dynamics and Control*, John Wiley & Sons, NY, 1989, pp. 184–185; 195–196.

*Primary Examiner*—Mary Lynn Theisen
*Attorney, Agent, or Firm*—Richard D. Schmidt; Fuisz Technologies Ltd.

[57] ABSTRACT

A material processing apparatus for thermo flow melt spinning having temperature control characteristics. The apparatus includes a spinner head with a chamber that has a continuous perimeter for centrifugal force and a heater element substantially continuous with the perimeter for providing heat to the head. The spinner head includes means for rotating and a power source connected to the heater element. The apparatus includes temperature detecting means integral with the heater element to detect a processing temperature and generate a temperature detection signal accordingly. Also included is a power controller for controlling the power source in accordance with the temperature detection signal. The processing temperature may be controlled such that a substantially constant temperature is maintained.

9 Claims, 6 Drawing Sheets

METHOD FOR SPIN PROCESSING MATERIAL HAVING TEMPERATURE FEEDBACK CONTROL

"This is a divisional of application Ser. No. 08/677,251 filed on Jul. 9, 1996" which is a continuation of application Ser. No. 08/425,337 filed Apr. 18, 1995, now abandoned, which is a continuation of application Ser. No. 08/049,773 filed Apr. 19, 1993, now abandoned.

BACKGROUND OF THE INVENTION

The present invention relates to melt spin processing machines, and, more particularly, to improvements in processing machines to enhance process capability.

Various spinning machines have been designed for spinning flowable materials, particularly sugar. The materials may be introduced to a spinning assembly within the spinning machine in molten form or, alternatively, introduced in solid form and heated to the flow point or subjected to flash-flow just prior to being spun out from the spinning assembly.

U.S. Pat. No. 4,872,821 discloses a spinning machine which is particularly designed for spinning cotton candy. The machine includes a spinner head having slotted, cylindrical walls and heating elements adjacent to each wall. Sugar in solid form is introduced into the spinner head and propelled against the heating elements where it is melted (i.e., undergoes flash-flow transition) and caused to travel through a tortuous path. The molten sugar is spun out through the slots where it solidifies into the floss-like material known as cotton candy.

Various other machines have been designed over the years for spinning cotton candy. One such machine is disclosed in U.S. Pat. No. 3,930,043. This machine includes a helical resistance heating element positioned within a finely perforated shell. The heating element is supported against the inner wall of the shell by spacer elements. As the shell spins, molten sugar is extruded through the perforations. Similar machines are disclosed in U.S. Pat. Nos. 3,073,262 and 3,070,045.

Still another machine for spinning substances is disclosed in commonly owned U.S. Pat. No. 5,427,811 to Fuisz et al. The application discloses a spinning head including a heating element which defines a narrow, elongate opening providing a substantially non-tortuous path through which feedstock material subjected to flash-flow is projected. Various other spinning machines of the prior art are referenced therein.

The basic machine includes a spinning head which has a heating element arranged circumferentially therearound. Sugar is introduced to the spinning head in conventional cotton candy machines and dispersed along the heating element. Heat thereby reduces the physical structure of the sugar sufficiently to permit the sugar to flow through openings and form a floss product. In early models, there was virtually no temperature control of the heating element.

More recently, however, various forms of temperature control were included in spinning machines of this type. Temperature control was used, for example, to provide additional heat energy during the first moments of powering a spinning head to expedite raising the temperature between the off state and the melt state. Further, thermostatic control was used to cut off heat energy to the head at a predetermined cutoff temperature.

U.S. Pat. No. 4,846,643 to Yamamoto, et al. discloses a spinning machine with a thermostatic switch for controlling heat flow to the bottom wall of a rotary vessel where the heat melts sugar to be spun contained therein. When the machine is first actuated, two separate heating means are powered. If the temperature of the bottom wall of rotary vessel exceeds a set temperature range, the thermostatic switch cuts off power to one of the heating means. If the bottom wall of the rotary vessel drops below the set temperature range, power is again applied to both heating means. Therefore, while the machine is activated, there will always be at least one heating means directing heat to the bottom wall of the rotary vessel.

Such temperature control is inexact. The temperature of the bottom wall of the rotary vessel may fall anywhere within the determined operating temperature range without inducing the temperature control system to react. In addition, a lag may exist between the detection of a temperature below the determined temperature range at the bottom wall of the rotary vessel and the application of additional heat through the second heating means. Similarly, a lag may exist between the detection of a temperature above the determined temperature range and the temperature control response thereto, i.e., the cutoff of power to the second heating means. Such response lags may result in temperature overshoot and undershoot of the determined temperature range.

U.S. Pat. No. 4,293,292 to Israel discloses a candy floss machine having a spinning head containing a heating element. During operation, a sugar dispenser dumps sugar into the spinning head via a chute where it is melted by the heating element. Heat is delivered to the spinning head periodically in varying heat cycles. Within the chute is a heat sensor for detecting the chute temperature. The time length of a given heat cycle and therefore the amount of energy provided to the heating element during the heat cycle is dependent on the detected chute temperature of the previous heat cycle.

The temperature detected during the prior heat cycle may also vary the time rate of heat delivery. Temperature control using such a method, however, is inexact. Heat is always applied to the heater element during the active heat cycle. The amount of heat is merely varied in accordance with a temperature detected during the previous heat cycle. Such a method prevents quick cooling even if it is determined during the prior heat cycle that the chute is overheated. Also, system response to a detected temperature will always lag detection by at least one heat cycle. Further, the placement of the heat sensor in the chute may allow a lag to develop between overheating of the sugar product and detection of such overheating in the chute where the detector is positioned.

U.S. Pat. No. 3,125,967 to Bowe discloses cotton candy machine controls having a thermostatically operated switch located near a heating unit in a spinner head. The switch prevents the spinning of the spinner head until the detected head temperature enters a particular temperature range at which time a switch actuates the motor to rotate the head. Rotation of the head circulates air to cool the heating unit. Only if the spinner head temperature exceeds the predetermined temperature range does the thermostatic switch open cutting off power to the heater circuit.

This method of temperature control is inexact. While heater power is cut off by the thermostatic switch, i.e., when the detected temperature exceeds the set range, nothing controls the rate of heat loss from the spinner head. Accordingly, the temperature may fall at a rate such that it will undershoot the temperature range minimum before the system can respond. The same problem arises with regard to increasing temperatures. Temperature may rise at a rate such that the temperature overshoots the maximum temperature range before the thermostatic switch cuts off power. System temperature therefore will usually be changing, that is, rarely uniform and at times extending outside the desired operating temperature range.

The lack of precision temperature control within the spinning machines of the prior art led to processing problems when temperature sensitive materials were used. Without precision temperature control, temperatures exceeding optimal melt temperatures resulted in overheating and burning of the product which plugged the openings for exit of processed product. Temperatures falling below optimal melt temperatures resulted in uneven melt and concomitant processing and product inconsistencies. Essentially, the prior art lacked a quantitative correlation between the melt viscosity and the power applied to the head. Oftentimes variations in temperature would result in shut down failures during start-up periods before the processing reached substantially steady state conditions.

It is therefore an object of this invention to provide a material processing apparatus for thermal flow melt spinning with temperature control characteristics capable of preventing over or underheating of melt-spin processing material.

It is another object of the invention to provide a material processing apparatus for thermal flow melt spinning wherein the temperature control characteristics are determined by the amount of power transmitted to a heating element within a melt spin head.

A still further object of the invention is to provide a material processing apparatus for thermal flow melt spinning wherein power control is achieved using a difference determined between a detected temperature of a heating element and an optimal processing temperature for a given material being processed.

SUMMARY OF THE INVENTION

In accordance with these and other objects of the invention, a material processing apparatus for thermal flow melt spinning is provided with temperature control characteristics. The apparatus includes a spinner head component with a chamber having a continuous perimeter for providing heat and centrifugal force to material being processed. The spinner head includes a heating element substantially continuous with the perimeter for providing heat responsive to power applied to it. Also included is a power source which transmits power to the heating element contingent upon a power control signal. Temperature detection means integral within the heating element detect a processing temperature at the heating element and generate a temperature detection signal corresponding to the processing temperature. Also included is a power controller electrically connected to the temperature detection means for receiving the temperature detection signal and generating a power control signal in response to the temperature detection signal, and electrically connected to the power source to transmit the power control signal thereto. In this manner, the processing temperature for the material being processed can be controlled to provide a substantially constant flow rate of said material through the spinner head.

The heating element embodies a continuous helical cable extending about the axis which includes a plurality of turns. Preferably, the continuous helical cable defines a narrow elongate opening which extends at least partially about the axis. The opening has a height of between 0.005 to 0.050 inches and defines a substantially non-tortuous path in which material may be heated and through which material may be projected from the chamber when the spinner head is rotated.

The power supplied by the power source controls the temperature of the heating element. Power may be supplied to the heating element in an amount equivalent to a part of an AC voltage signal exceeding a voltage level defined by the control signal. Power also may be supplied to the heating element for a percentage of a period of an AC voltage signal where the percentage is defined by the control signal.

The power control signal is determined by a difference between a detected processing temperature and the optimal processing temperature for a material being processed. The power controller may be a proportional integral differential (PID) controller. The power controller may contain a memory in which optimal processing temperature is provided according to a material being processed.

The temperature detection means electrically couples the temperature detection signal to the power controller via electrical wires connected at one end to the temperature detection means. The electrical wires extend through the center of a motor shaft to a pair of rotating electrical contacts at a base of the motor shaft. A second set of electrical wires electrically connects the rotating electrical contacts with the power controller.

The temperature detection means may be positioned such that they are in contact with the heating element, preferably inside the substantially continuous perimeter. The temperature detection means may be brazed to the heating element or positioned within the heater core of the heating element.

A method for temperature controlling thermal flow melt spinning is also provided by the invention. The method includes the steps of introducing processing material to a chamber within a spinner head containing a heating element, supplying power to the heater element, detecting a temperature at a locus where an internal flow condition for the processing material is created, and transmitting a signal to the power source dependent on the detected temperature such that the internal flow condition is controlled in accordance with the temperature. The temperature may be controlled within the temperature ranges of ±8 centigrade degrees, ±3 centigrade degrees and ±1 centigrade degree.

DETAILED DESCRIPTION OF THE INVENTION

A material processing method and apparatus is provided for thermal flow melt spinning with temperature control characteristics.

"Thermal-flow" as used herein refers to solid materials which flow when heated, i.e., they undergo intrapartical flow when heated prior to undergoing substantial degradation or decomposition. Thermal-flow materials include thermoplastic polymers as well as materials such as sugars, saccharides, polysaccharides, etc., which exhibit intraparticle flow when heated. Examples of such materials are sugars as disclosed in U.S. Pat. No. 4,855,326, issued Aug. 8, 1989, polydextroses as disclosed in U.S. Pat. No. 5,279,849 issued Jan. 18, 1994, maltodextrins (including corn syrup solids) as disclosed in U.S. Pat. No. 5,387,431 issued Feb. 7, 1995, and thermoplastic polymers such as disclosed in U.S. application Ser. No. PCT/US92/04053, filed May 13, 1992, and biodegradable polymers as disclosed in U.S. Pat. No. 5,518, 730 issued May 21, 1996, all of which are incorporated herein by reference.

Thermo-flow "melt spinning" as used herein refers to a process by which thermo-flow material is subjected to flash flow sufficiently to deform and pass through an opening under a centrifugal force provided by a spinner head. After the flowable material is thrown through the opening at high speed, it instantaneously reforms as a solid having altered physical and/or chemical structure. The altered structure results from the forces acting on the material as it exits the head and is hurled outwardly during the brief period during which it experiences flash flow.

Figure 1:
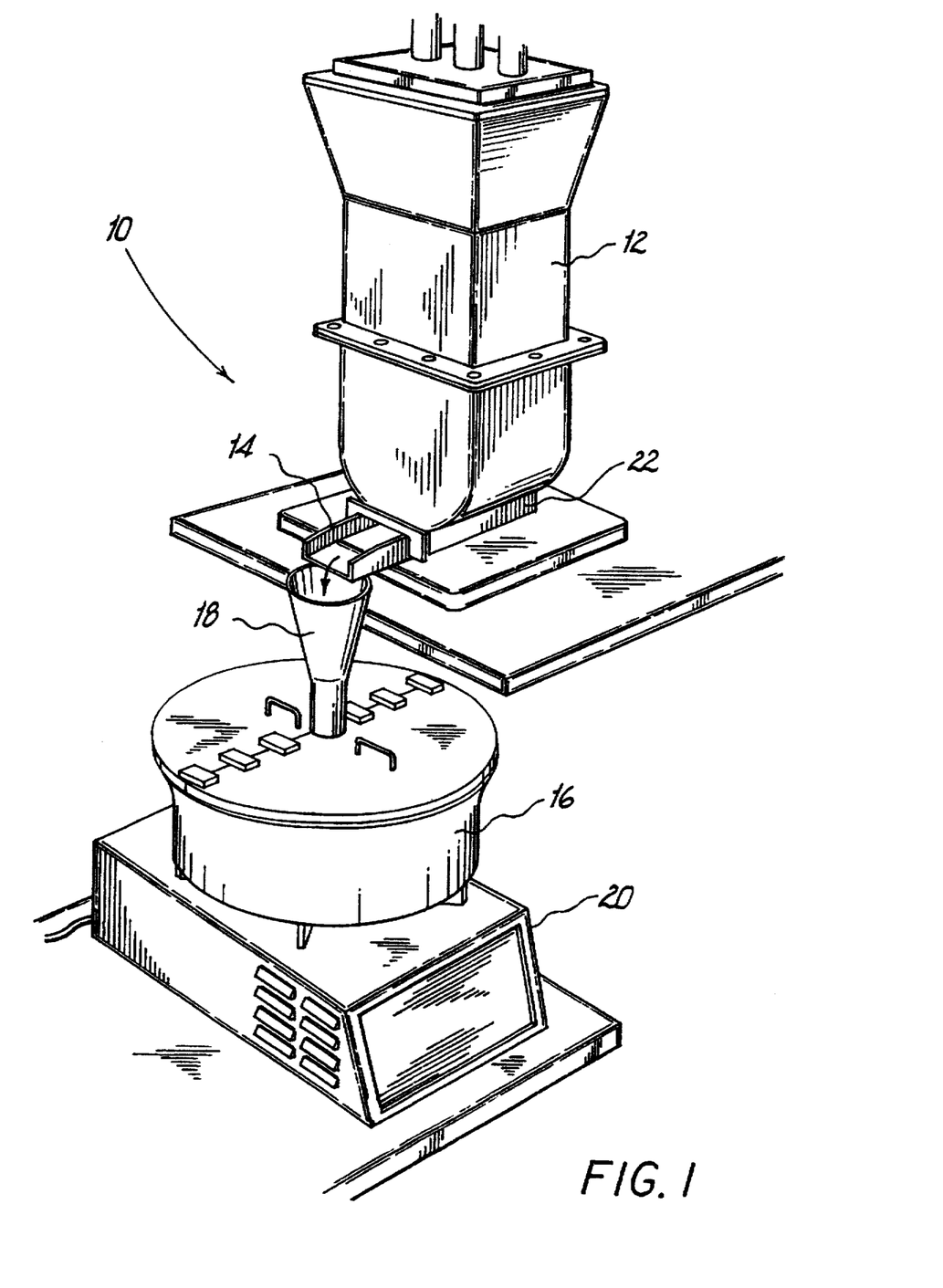
FIG. 1 is a perspective view of an assembly for processing thermal flow materials.

Referring now to FIG. 1, an assembly 10 is shown for feeding materials through a spinner head where they may be subjected to a flash-flow process and collected in a basin or basket or air conveyed to another location or to a collection container. The assembly includes a hopper 12, a chute 14, a basin 16, a spinner head (not shown) positioned within the basin 16, a funnel 18 for directing material from the chute 14 to the spinner head, and a base 20. A feeder assembly 22 is positioned at the base of the hopper 12, the chute 14 extending therefrom. The feeder assembly may include a screw-type feeder or the like for moving material from the hopper to the funnel 18. The base includes a motor (not shown) for driving the spinner head in a known manner as described in U.S. Pat. No. 4,872,821 (incorporated by reference herein), which has been converted to a variable speed drive system.

Figure 2:
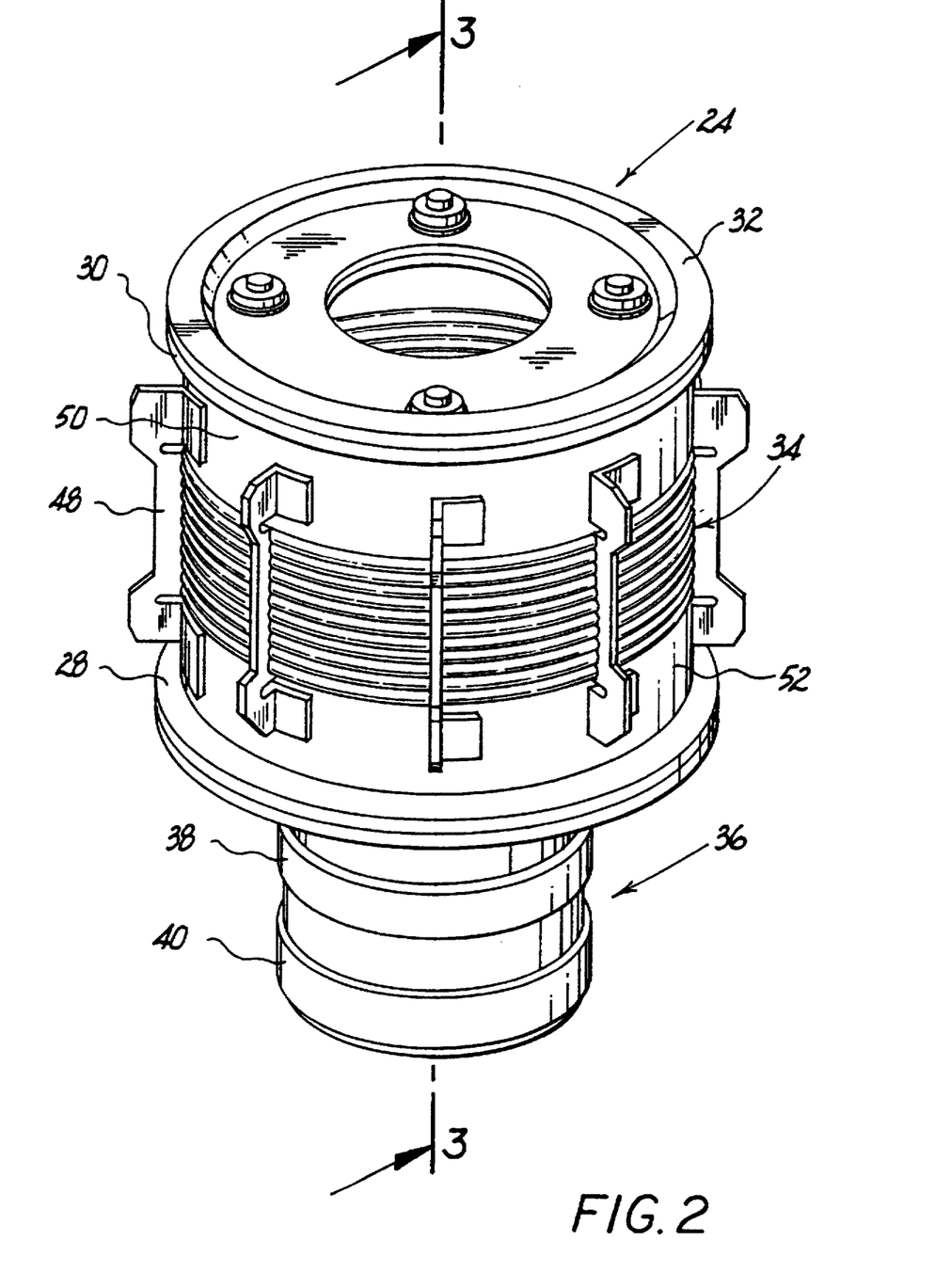
FIG. 2 is a perspective view of a spinner head in accordance with the present invention.
Figure 3:
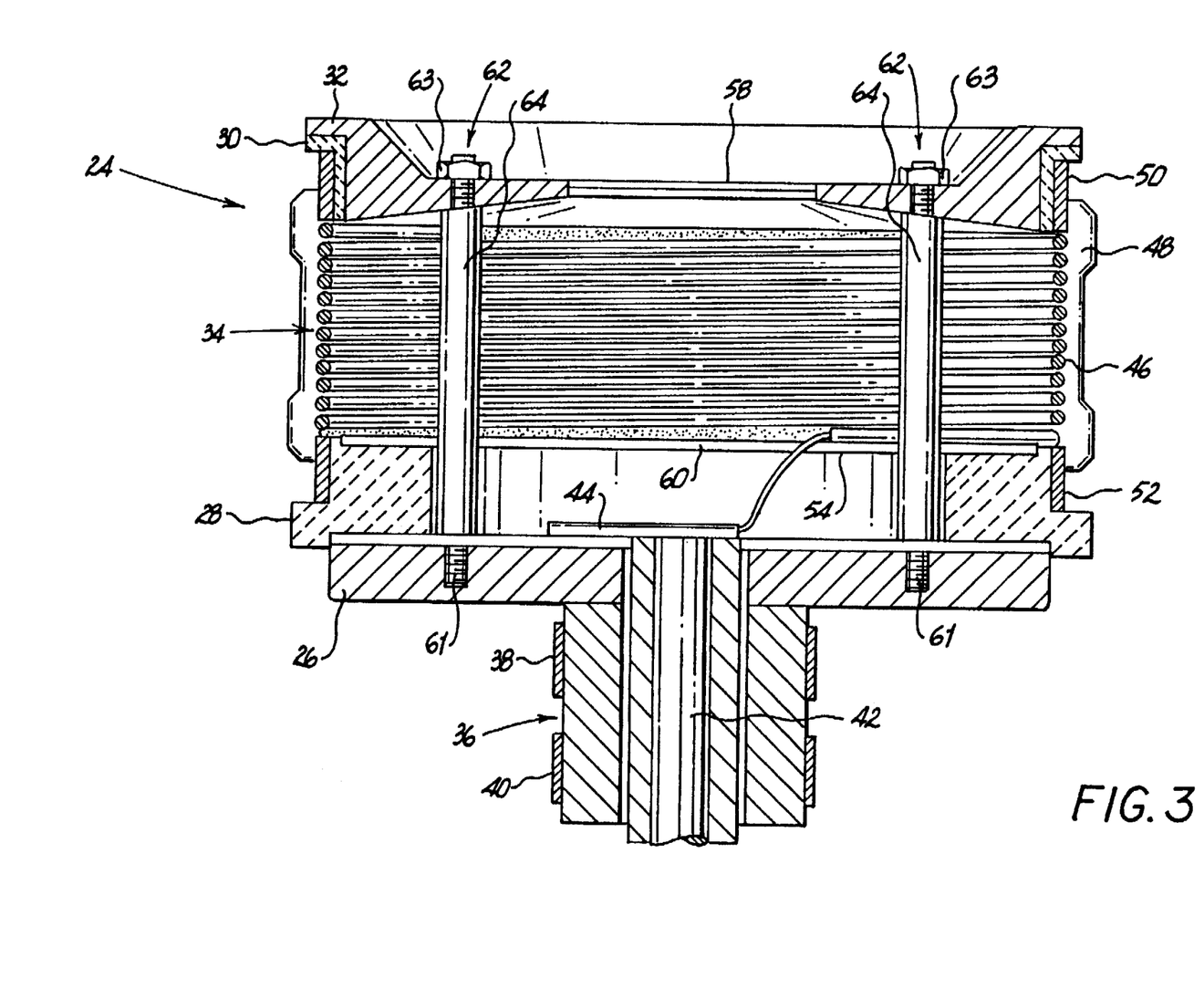
FIG. 3 is a cross-sectional view thereof taken along line 3—3 of FIG. 2.

FIGS. 2-3 show a spinner head 24 according to a first embodiment of the invention. The spinner head includes a base member 26, a bottom insulating ring 28, a top insulating ring 30, an aluminum cap 32, and a heating element 34. The base and cap may be made from stainless steel or other suitable material, while the insulating rings are preferably from a ceramic material or heat resistant polymer. The cap includes an opening aligned with the funnel 18.

A stem 36 extends from the base 20. The stem includes slip rings 38, 40 which are engaged by brushes (not shown), and an upright motor shaft 42 which is driven by a motor 21 (not shown) within the base 20. The stem is similar to that disclosed in U.S. Pat. No. 4,872,821, and functions in a similar manner. An electronic interface assembly 44 is mounted to the base member 26, and powers the heating element 34.

The heating element 34 is comprised of a cable 46 which is wound helically about the axis of rotation of the spinner head 24. While the cable 46 forms a single helix as shown in the drawing, it may alternatively be wound as a double helix or multiple helixes, i.e., such as eight separate cables. Cable heaters are well-known commodities, and are used in a number of applications, including some of the cotton candy machines discussed above. A suitable cable includes a core heating element (not shown) such as a nichrome or aluminum wire, an outside sheath (not shown) made from a corrosive-resistant alloy, such as nickel-chromium-steel alloy sold under the trademark INCONEL, and high temperature electrical insulation such as magnesium oxide.

In this embodiment, the cable structure forming heating element 34 is used to define the openings through which material is projected after undergoing flash-flow transition. In other words, heating element 34 of the present embodiment is constructed not only to heat the material in the spinner head, but also to contribute to the ultimate morphology or shape of the material projected by the spinner head into the basin (to be described in greater detail below). Together with the bottom portion of the spinner head, heating element 34 defines a substantially cylindrical chamber for receiving material from the feeder 22.

In order to function in the desired manner according to the invention, the cable 46 is wound such that the distance between turns of heating element 34 is s mall enough to both heat and shape the material hurled against it as the spinner head rotates. The preferred spacing between turns is about 0.005 to 0.050 inches for most spinning operations. In the case of sucrose, the spacing between turns should be between 0.005 and 0.010 inches. It is important for the spacing between coils of cable 46 to be not only small, but also uniform for most spinning operations. Uniform spacing is required for producing a product having uniform physical characteristics. This is achieved in the first embodiment of the invention through the use of comb-like spacing elements 48, each of which includes a plurality of arcuate notches therein.

The diameter of the notches is about the same as the diameter of the cable 46. Each notch is spaced apart by selected uniform distance, preferably 0.005 to 0.050 inches. The spacing elements 48 may be fabricated from 18 gauge stainless steel or other suitable material. They may be spot welded to upper and lower cylindrical shelves 50, 52 which define outer surface portions of the spinner head. The cable 46 is brazed to the spacing elements. The cable 46 accordingly forms a substantially perfect spiral which defines the cylindrical wall enclosing the spinner head 24. A plurality of narrow, elongate openings are defined by the cable 46 and spacing elements 48. These openings together form a substantially continuous, narrow helical opening which extends about the axis of rotation of the spinner head. It is within these openings that a temperature detector of the present invention is inserted (to be discussed in greater detail below). Spacing elements 48 do not adversely affect the flash-flow process or materially impede the projection of product from the chamber.

An interface shield 54 defines the lower wall of the chamber while the cap 32 defines the upper wall thereof. Insulating ring 30 is positioned between the upper shelf 50 and the cap 32. The ring 30 may be made from a phenolic material or other suitable material providing heat insulation. A layer 58 of brazing material is provided between the cap 32 and the upper turn of heating element 34. A second layer 60 of brazing seals the opening between the bottom turn of the heating element and the interface shield 54. The brazing material seals ensure that the only opening through which material may exit the spinner head 24 is the helical opening between turns of the heating element 34. While brazing material has been used to make the seals, other materials such as epoxy materials may also be used. As the cap between the turns is uniform, a uniform product is obtained.

The temperature of heating element 34 cannot be accurately determined through adjustment of a power setting to it. Different amounts of power are required to vary the temperatures of different types of thermal-flow material being processed. For example, sucrose processes at temperatures around 190° C. while maltodextrins process at temperatures of 95° to 160° C. depending on the saccharide content of the maltodextrin. The temperature of heating element 34 increases with decreasing volume of thermal-flow material within the spinning head 24 without precise temperature control. In addition, variations in feed-flow of the thermal-flow material to the head 24 results in variations in head temperature absent any temperature control mechanism. Overheating may cause burning or degradation of the thermal-flow material which will plug the openings in the coil formed of cable 46. Accordingly, precise temperature control is extremely important, especially during start-up.

Figure 4:
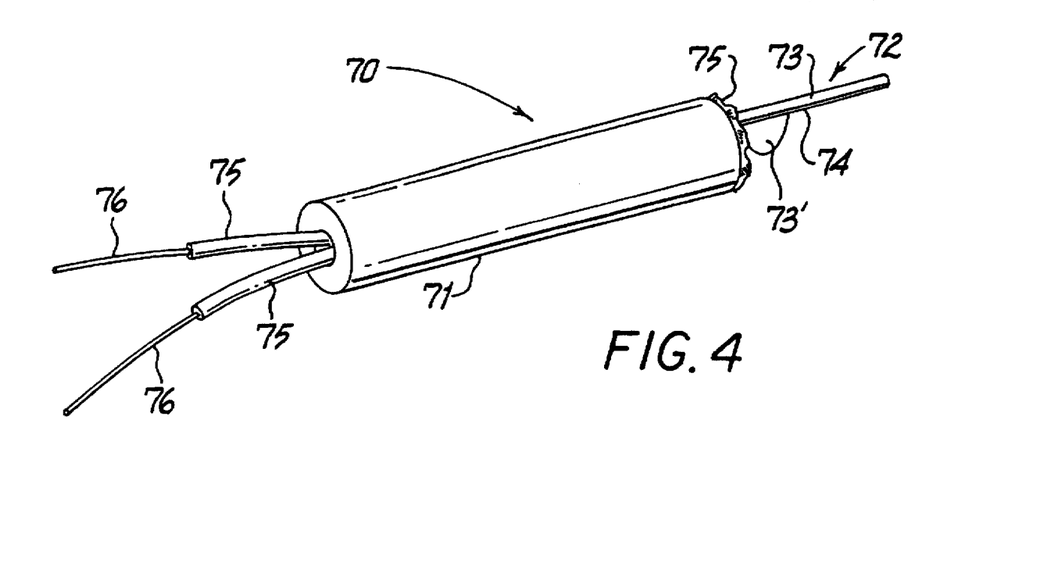
FIG. 4 is a perspective view of a temperature detector of the present invention.

FIG. 4 shows a temperature detector 70 according to one embodiment of the present invention used to maintain uniform temperature control. The temperature detector includes a resistance temperature detector (RTD) 72, an insulating tube 71, and a pair of wires 76 wrapped in an insulating material 75. It should be noted however, that the invention is not limited to the use of an RTD 72. Any temperature sensitive device such as a thermistor or thermocouple, which provides an electrical signal proportional to the detected temperature or temperature change may be used in conjunction with temperature detector 70.

RTD 72 comprises a probe portion 73 made of an electrically non-conducting material such as a ceramic material. Upon one surface of the probe portion is vapor phase deposited a layer or pattern of platinum 74. Connecting wires 76 are connected to an anode and cathode each of platinum layer or pattern 74. The wires are attached using a refractory paste or the like and the connections are covered with a second portion of non-conducting material 73. Tube 71 may comprise any heat insulating material such as high temperature ceramic. The tube, however, is not limited to an insulating material but may be made of stainless steel, aluminum, or the like as long as it is electrically insulated from the wires. Because of the nature of the non-conducting material comprising probe portion 73 and the heat insulating nature of tube 71, the detector probe 70 is capable of withstanding direct heat without degradation of its temperature detection ability.

Figure 5:
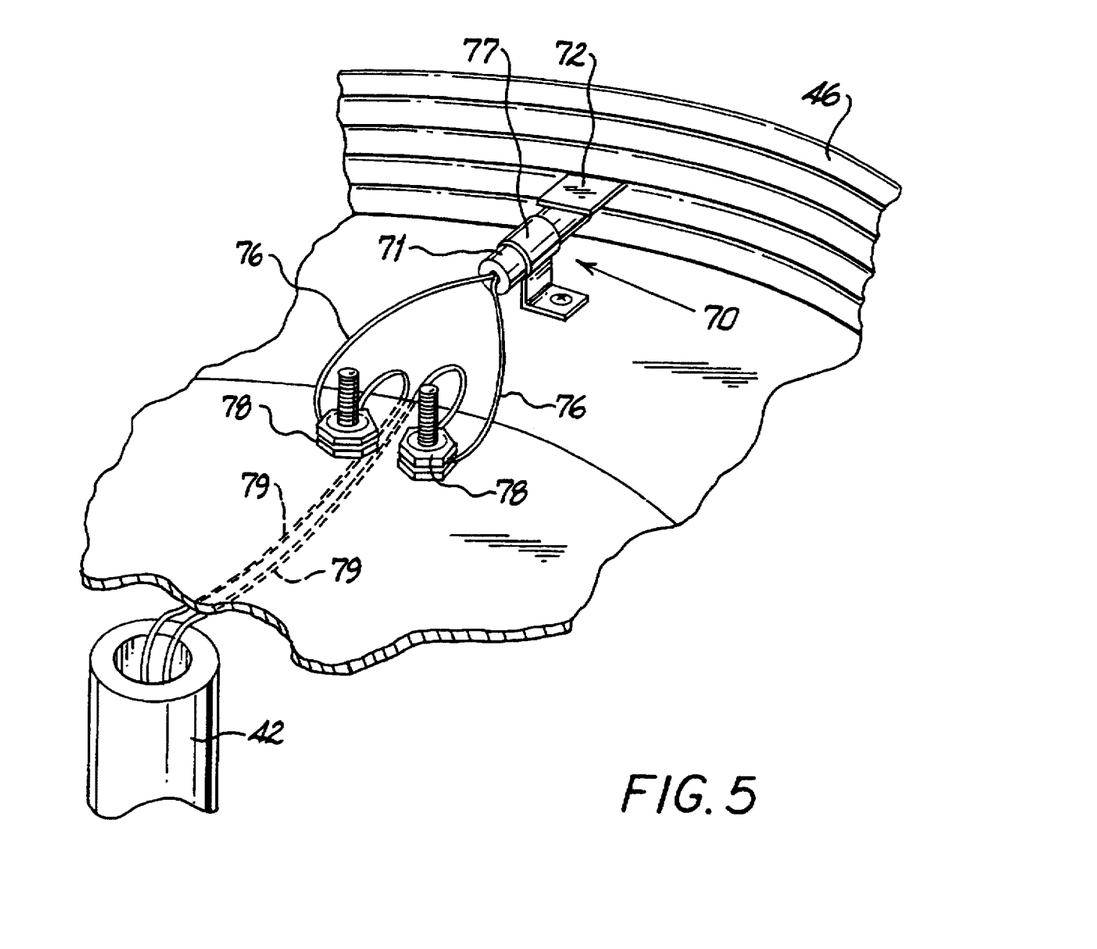
FIG. 5 is an enlarged, partially sectional view of a portion of a spinner head having temperature detection means inserted therein.

FIG. 5 shows one embodiment of the present invention whereby temperature detector 70 is positioned within spinner head 24 in contact with cable 46 of heating element 34. RTD portion 72 is inserted between the turns of cable 46 such that it is in direct contact with the heating element. This arrangement allows for substantially instantaneous detection of the temperature of the heating element 34 and thereby the temperature which the melt material is subjected.

An insulating tube 71 of temperature detector 70 is fixed to the spinner head 24 by a retaining bracket 77. Conducting wires 76 extend out of insulating tube 71 for connection at electrical terminals 78. Connecting wires 79 from terminals 78 provide an electrical path to rotating electrical contacts (designated as 90 in FIG. 6). Connecting wires 79 are passed through an opening in motor shaft 42. Electrical contacts 90 are electrically connected to a power controller 80 (to be discussed in greater detail below) for the receipt of a temperature detection signal generated within the RTD. Temperature detector 70 as mounted does not adversely affect the flash-flow process or materially impede the projection of product from the chamber. It should be noted that the present invention is not limited to the specific embodiment shown.

The temperature detection mechanism of the present invention is not limited to the embodiment shown in FIG. 5 and described above. An RTD 70 or a thermocouple (not shown) may be positioned within cable 46 of heating element 34, adjacent to but separate from the core heating element contained therein. Extremely accurate temperature detection of the temperature of heating element 34 is attained by such an arrangement.

In another embodiment of the temperature detection mechanism of the present invention, the wire of the heating element 34 itself, i.e., the core heating element within cable 46, may be used as a temperature detector. This is because the resistance of the core heating element changes with temperature and provides the temperature detection signal.

The use of the resistance of the core heater element to detect changes in temperature must be in conjunction with an appropriate power controller 80 (to be described in greater detail below) and preferably silver plated slip rings 38, 40, or slip rings comprising other appropriate material, in order to reduce electrical noise.

In another embodiment of the present invention, a thermocouple or RTD (not shown) may be brazed directly to the surface of cable 46 of heating element 34, preferably a surface internal to the cylindrical chamber formed by the coiled cable.

Figure 6:
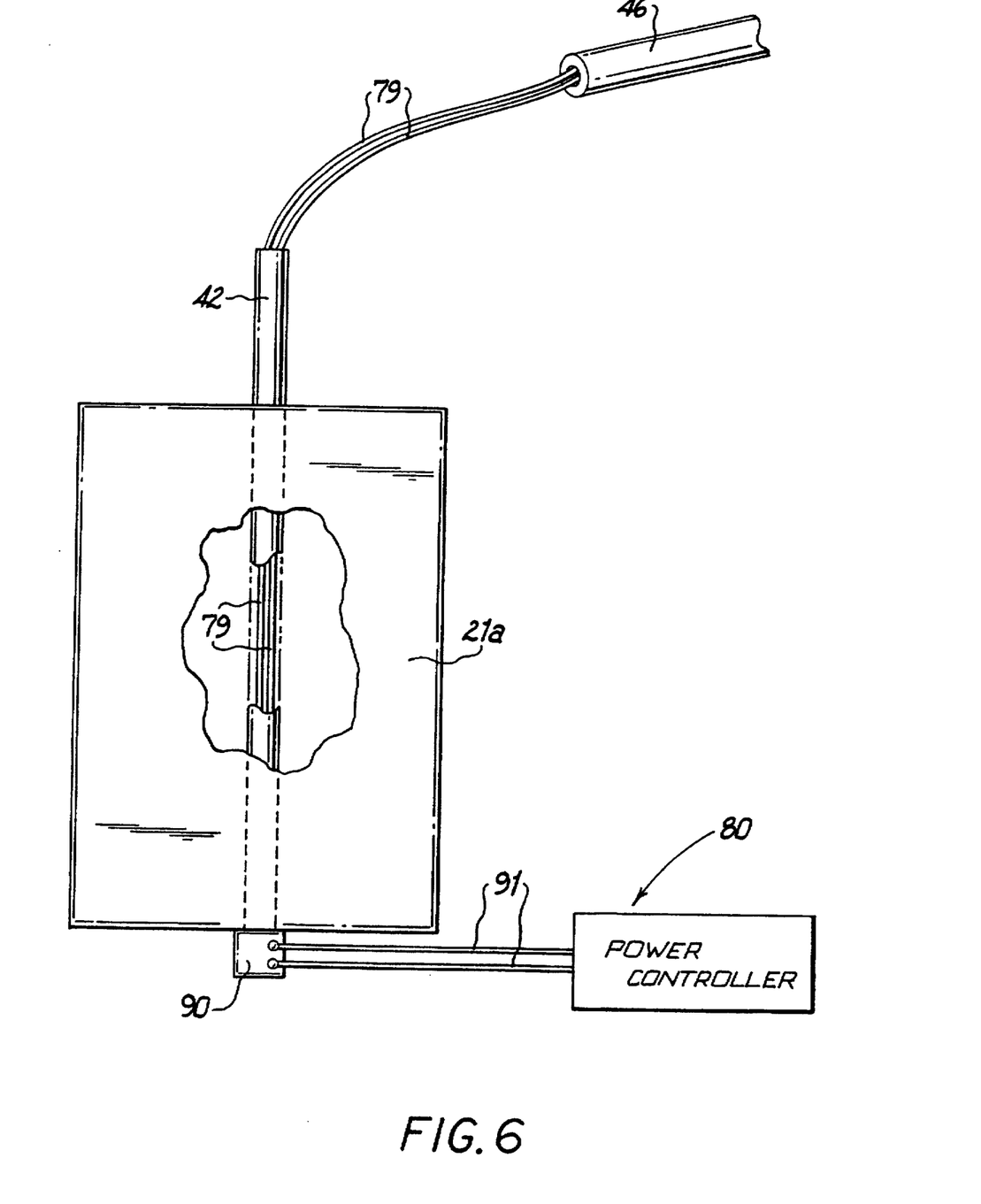
FIG. 6 is an enlarged perspective view depicting the routing of wires through a motor shaft.

In another embodiment of the present invention, FIG. 6 shows a unique mounting arrangement for electrically connecting an RTD or thermocouple (not shown) within spinner head 24 to a power controller (not shown). Wire leads 79 extend out from the core of cable 46, where they are attached to an RTD or thermocouple housed therein (discussed above). Wire leads 79 pass through motor shaft 42 of a motor body 21a to a pair of rotating electrical contacts 90. Electrical contacts 90 electrically connect a pair of electrical wires 91 to power controller 80. Power sensing contacts 90 are distinct from a power supply contact ring (not shown).

Figure 7:
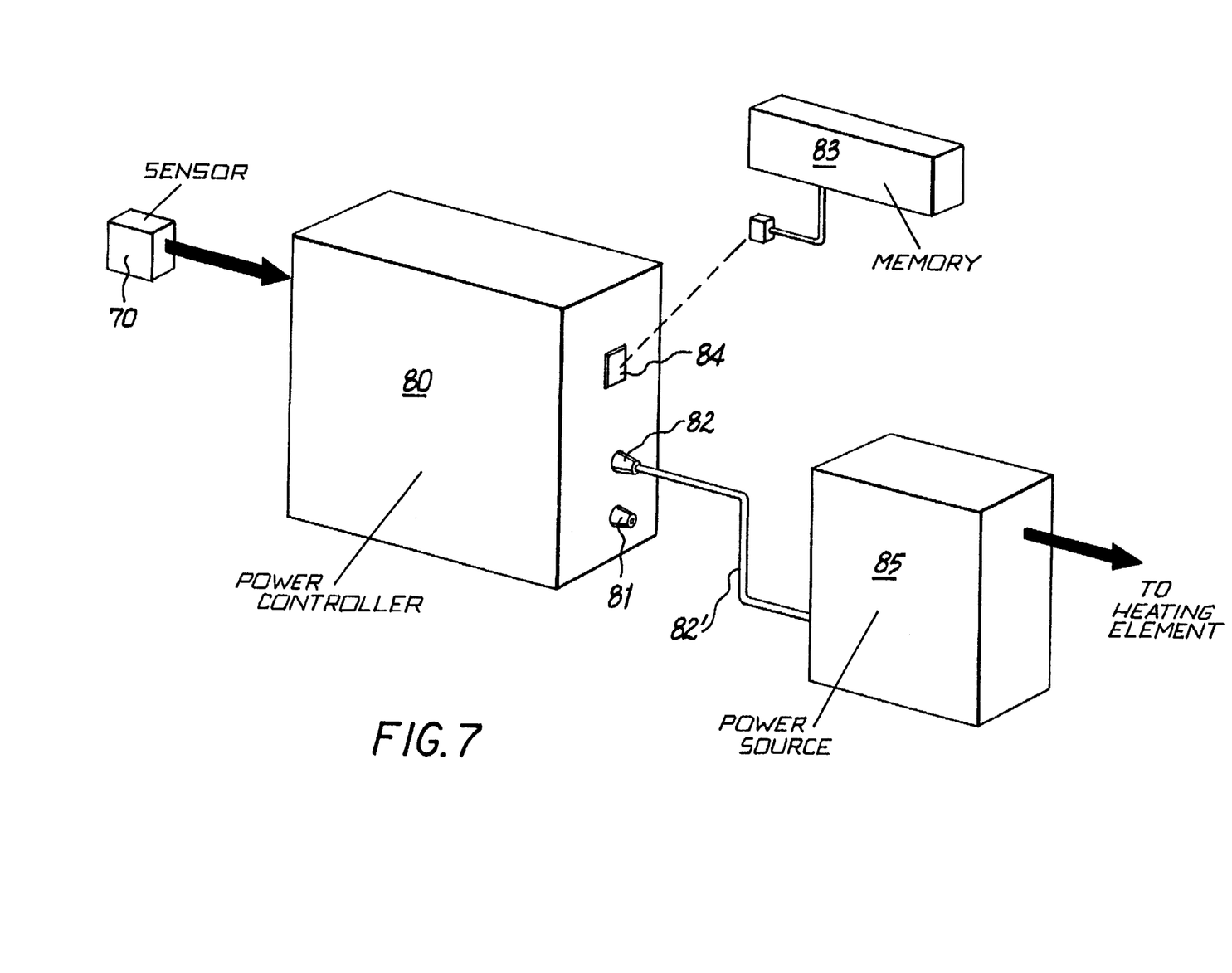
FIG. 7 is a block diagram depicting a power source, power controller and optional memory for use with the present invention.

FIG. 7 shows a power controller 80 and power source 85 according to yet another embodiment of the invention. Power controller 80 may be a proportional integral differential (PID) controller but is not limited thereto. Any power controller may be used which is capable of supplying power to the core heating element and thereby accurately maintain a detected temperature within a range of ±8 centigrade degrees, or more preferably within a range of ±3 centigrade degrees, or most preferably within a range of ±1 centigrade degree. During operation, the PID 80 receives a temperature detection signal via input port 81 and outputs a power control signal containing the temperature-based power control information via output port 82. In the case where the temperature detector employed is based on a temperature dependent resistance of the core heater element itself, the PID 80 must be capable of detecting such resistance based temperature differences inherent in the temperature detection signal.

An optional memory 83 is also shown in FIG. 7. Memory 83 may be used to store power control codes or the like associated with melt materials or environmental conditions for use by power controller 80. The power signal output, with such an arrangement, would be based on both the detected temperature and the memory stored control information. The power control signal is dispatched to a power source 85 via electrical wire 82.

Power source 85 may be any conventional power source with some type of signal activated switching control means (not shown), such as a relay, for switching power to the heating element (on/off) in accordance with the power control signal. The switching control means may be any switching control device known to those skilled in the art for supplying power as above-described.

The operation of the present invention is as follows. A thermal-flow material or combination of materials is introduced into the hopper 12. The feeder 22 conveys these materials into the spinner head 24. The spinner head is caused to rotate at a selected speed about the axis of the shaft 42, whereby the materials are propelled directly against the substantially cylindrical wall defined by heating element 34. The materials are subjected to sufficient heat to allow them to undergo flash-flow as they pass through the narrow, elongate, substantially continuous opening.

As the flow path between turns of the heating element is both short and straight, the time the material remains in contact with the cable is minimal. This reduces the chance of the applied head causing degradation of materials passing through the heating element. Because the temperature of the heat applied to the material is instrumental in defining the quality of the finished product, precision feedback temperature control provides a greatly improved finished product. Upon undergoing flash-flow, the materials are projected through the opening directly into the basin 16 due to the considerable centrifugal force generated upon rotation of the spinner head and the substantial absence of impediments on either side of the heating element 34.

The morphology of the finished product, which reforms as a solid upon exiting the spinner head, depends upon the speed at which the spinner head is rotated, the temperature maintained by the heating element, the distance between turns on the cable, and the materials introduced to the spinner head. The spinning of corn syrup solids, for example, results in the generation of sheet-like flakes. Higher temperatures cause smaller flakes to be produced than lower temperatures and can result in a portion of the product produced being degraded to a brown condition. Precision temperature control is therefore tantamount to desired product characteristics.

The feedback temperature control of the spin processing machine of the present invention is as follows. When the temperature detector 70 (with RTD 72) is positioned at cable 46 of heater element 34 within the spinner head 24 as above-described, changes in spinner head temperature are detected. The detected spinner head temperature changes produce a temperature detection signal which is transferred to power controller 80. The temperature detection signal is proportional to the temperature dependent resistance of the RTD. The power controller 80 then determines the amount of power to be delivered by the power source 85 to the core heater element based on the difference between the temperature detection signal and an internal digital set point.

The set point temperature information may be input into the controller by the user or may be derived from the memory 83 attached to the power controller 80. A power control signal is then output to the power source thereby determining the average power supplied to the heater element. The power applied to the melt heater and therefore its temperature are controlled precisely based on the difference between the temperature of the heater element and the optimal temperature for a particular product melt.

The power control implemented by the power controller 80 may be any one of a number of methods known in the art. One such method supplies power to the heater element proportional to the duty cycle of a 1 Hz signal (power control signal) driving the power source 85. Power is applied one time per second for some fraction of a second. Varying the duty cycle of the 1 Hz signal varies the on/off time of the power source thereby varying the average power to the heater. The temperature of the head, dependent on the applied power, is thereby controlled by the duty cycle of the 1 Hz signal (power control signal).

A second method of supplying power to the heater element which may be implemented by the present invention limits the on time of the power control signal to that portion of a 60 Hz AC power signal which lies above a particular voltage level (phase angle fired controller). The power control signal actuates the power source only for that portion of each cycle of the 60 Hz signal where the voltage rises above a feedback controlled voltage level. The average power to the heater element is thereby defined. Because different products have different optimal melt temperatures, the sensitivity of this constant feedback provides a marked improvement in product quality temperature control.

While the preferred embodiments of the invention have been shown described herein, it will be appreciated by those skilled in the art that various approaches may be taken for providing a material processing apparatus for thermal-flow melt spinning with temperature control characteristics. For example, once the temperature of the heating element within the head has been detected, the average power provided to the heating element may be defined in any way known in the art. The specific materials identified in the disclosure may be replaced by other materials without materially affecting the operation of the spinner head according to the invention. The invention accordingly is not limited to the precise embodiments disclosed, and various other changes and modifications may be affected therein by one skilled in the art without departing from the scope or spirit of the invention.

What is claimed is:

1. A temperature controlled thermo flow melt-spinning process, comprising the steps of:

introducing processing material to a chamber within a spinner head containing a heater element;

supplying power to said heater element in order to process said material;

detecting a temperature at a locus on said heater element where an internal flow condition for the processing material is created; and transmitting a signal to said power source dependent on the detected temperature such that the internal flow condition may be controlled.

2. The melt-spinning process defined in claim 1, further comprising the step of:

maintaining the detected heater element locus temperature within a temperature range of ±8 centigrade degrees.

3. The melt-spinning process defined in claim 1, further comprising the step of:

maintaining the detected heater element locus temperature within a temperature range of ±3 centigrade degrees.

4. The melt-spinning process defined in claim 1, further comprising the step of:

maintaining the detected heater element locus temperature within a temperature range of ±1 centigrade degree.

5. A method of thermo flow melt spin processing of a solid material capable of intraparticle flow comprising the steps of:

providing a spinner head having a perimetrical processing wall, said processing wall being formed of an electrically powered resistance heater having at least one opening through which said material is processed;

inserting said material into said spinner head;

heating said processing wall to a processing temperature sufficient to effect said intraparticle flow of said material;

rotating said spinner head to urge said material through said processing wall; and controlling said temperature of said processing wall at a location thereon where said material undergoes said intraparticle flow.

6. A method of claim 5 wherein said controlling step further includes:

detecting said temperature of said processing wall directly at a location therein adjacent said opening; and selectively controlling power supplied to said heater in response to said detected temperature so as to maintain said processing wall temperature at said processing temperature.

7. A method of claim 6 wherein said detecting step further includes: providing a temperature detector attached to said processing wall adjacent said opening.

8. A method of claim 7 wherein said selectively controlling step further includes: providing a power assembly responsive to said detected temperature at said processing wall for selectively suppling said power to said heater.

9. A method of claim 8 further including the step of: placing said temperature detector within said opening.

* * * * *